(12) United States Patent
Lincoln et al.

(10) Patent No.: US 10,169,018 B2
(45) Date of Patent: Jan. 1, 2019

(54) DOWNLOADING A PACKAGE OF CODE

(71) Applicant: INTERNATIONAL BUSINESS MACHINES CORORATION, Armonk, NY (US)

(72) Inventors: Nicholas K. Lincoln, Hursley (GB); Josephine D. Messa, Hursley (GB); Simon D. Stone, Hursley (GB)

(73) Assignee: International Business Machines Corporation, Armonk, NY (US)

( * ) Notice: Subject to any disclaimer, the term of this patent is extended or adjusted under 35 U.S.C. 154(b) by 68 days.

(21) Appl. No.: 14/856,806

(22) Filed: Sep. 17, 2015

(65) Prior Publication Data

US 2017/0083302 A1   Mar. 23, 2017

(51) Int. Cl.
G06F 9/445 (2018.01)
G06F 8/60 (2018.01)
H04L 29/08 (2006.01)

(52) U.S. Cl.
CPC ............ *G06F 8/60* (2013.01); *H04L 67/2823* (2013.01); *H04L 67/30* (2013.01); *H04L 67/34* (2013.01)

(58) Field of Classification Search
CPC ............ G06F 8/60; H04L 67/02; H04L 67/10
See application file for complete search history.

(56) References Cited

U.S. PATENT DOCUMENTS

| | | | |
|---|---|---|---|
| 5,995,756 A * | 11/1999 | Herrmann | G06F 9/44526 709/216 |
| 7,814,477 B2 | 10/2010 | Sun et al. | |
| 8,032,860 B2 | 4/2011 | Piehler et al. | |
| 8,635,673 B2 | 1/2014 | Anand et al. | |
| 8,732,662 B1 * | 5/2014 | Savant | G06F 9/4443 717/120 |
| 8,793,359 B1 | 7/2014 | Fiebig et al. | |
| 8,850,528 B2 | 9/2014 | Van Biljon et al. | |
| 2002/0138545 A1 | 9/2002 | Andreakis et al. | |
| 2006/0265702 A1 | 11/2006 | Isaacson et al. | |
| 2006/0277286 A1 * | 12/2006 | Zhang | H04L 67/02 709/223 |
| 2011/0066999 A1 * | 3/2011 | Rabinovich | G06F 8/51 717/104 |
| 2011/0126168 A1 | 5/2011 | Ilyayev | |
| 2011/0209141 A1 * | 8/2011 | Hughes | G06F 7/53 717/173 |
| 2012/0174061 A1 | 7/2012 | McCollum et al. | |
| 2013/0263086 A1 | 10/2013 | Carter et al. | |

(Continued)

OTHER PUBLICATIONS

Lincoln, Nicholas K. et al., "Download of a Package of Code," U.S. Appl. No. 14/857,056, filed Sep. 17, 2015, pp. 1-30.

(Continued)

*Primary Examiner* — Hanh Thi-Minh Bui
(74) *Attorney, Agent, or Firm* — Heslin Rothenberg Farley & Mesiti P.C.; Richard Wilhelm

(57) ABSTRACT

A system includes a network interface and a processor connected to the network interface. The network interface receives a request from a client for download of a package of code, the request specifying the package of code to be downloaded, and transmits a modified package of code to the client. The processor acquires information from the received request relating to the client and/or a user of the client and modifies the package of code according to the acquired information.

12 Claims, 6 Drawing Sheets

(56) References Cited

U.S. PATENT DOCUMENTS

| | | | |
|---|---|---|---|
| 2014/0032650 A1* | 1/2014 | Singh | H04L 41/00 709/203 |
| 2014/0156467 A1* | 6/2014 | Typaldos | G06Q 30/04 705/26.81 |
| 2014/0157254 A1 | 6/2014 | Hoff et al. | |
| 2014/0372963 A1 | 12/2014 | Chandaria et al. | |
| 2016/0021245 A1* | 1/2016 | Chmaytelli | H04L 63/101 455/415 |

OTHER PUBLICATIONS

List of IBM Patents or Patent Applications Treated as Related, Sep. 17, 2015, pp. 1-2.
Office Action dated Nov. 1, 2016 for U.S. Appl. No. 14/857,056, 19 pages.
Final Office Action dated Apr. 4, 2017 for U.S. Appl. No. 14/857,056, 19 pages.

\* cited by examiner

DOWNLOADING A PACKAGE OF CODE

BACKGROUND

Aspects of the present invention relate to downloading a package of code.

SUMMARY

In accordance with an aspect of the present invention, a computer-implemented method is provided. The computer-implemented method includes receiving at a server a request from a client for download of a package of code, the request specifying the package of code to be downloaded; acquiring information from the request received relating to at least one of the client or a user of the client; modifying the package of code according to the acquired information to provide a modified package of code; and transmitting the modified package of code to the client.

In accordance with another aspect of the present invention, a system is provided. The system includes a network interface to receive a request from a client for download of a package of code; and a processor connected to the network interface, wherein the system is configured to perform a method. The method includes receiving the request from the client for download of the package of code, the request specifying the package of code to be downloaded; acquiring information from the request received relating to at least one of the client or a user of the client; modifying the package of code according to the acquired information to provide a modified package of code; and transmitting the modified package of code to the client.

In accordance with yet another aspect of the present invention, a computer program product is provided. The computer program product includes a computer readable storage medium readable by a processing circuit and storing instructions for execution by the processing circuit for performing a method. The method includes receiving at a server a request from a client for download of a package of code, the request specifying the package of code to be downloaded; acquiring information from the request received relating to at least one of the client or a user of the client; modifying the package of code according to the acquired information to provide a modified package of code; and transmitting the modified package of code to the client.

BRIEF DESCRIPTION OF THE DRAWINGS

Embodiments of the present invention will now be described, by way of example only, with reference to the following drawings, in which.

DETAILED DESCRIPTION

One or more aspects of the present invention relate to modifying a package of code prior to downloading the package of code.

Figure 1:
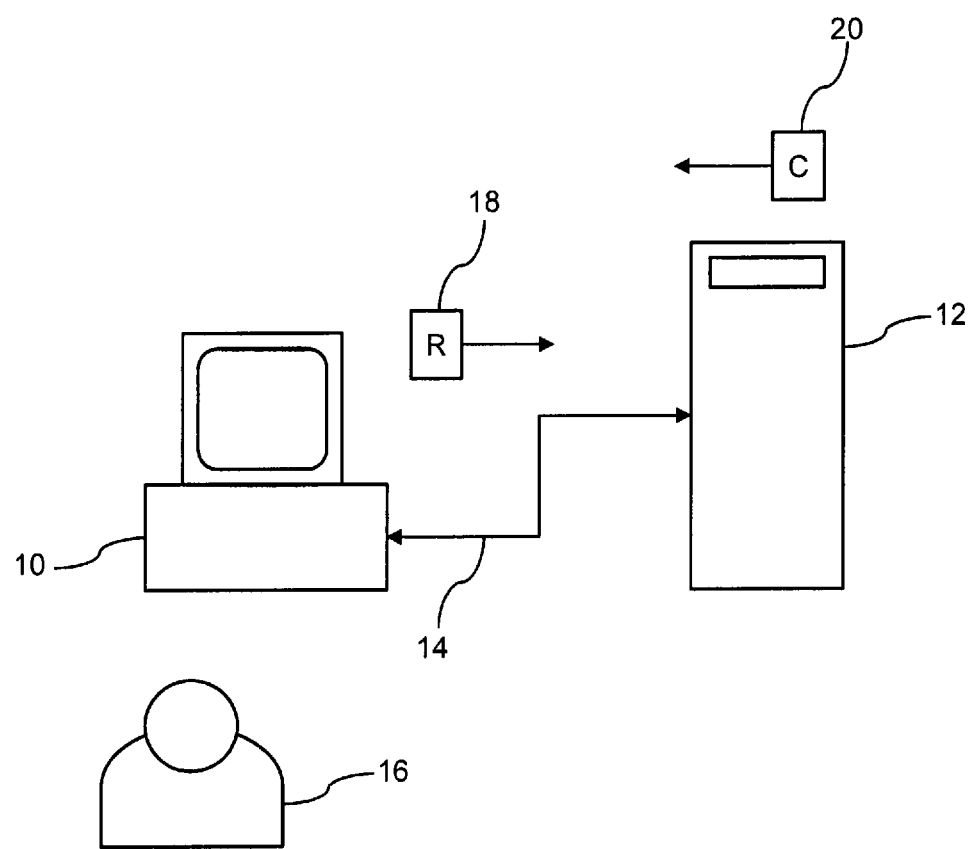
FIG. 1 is one example of a schematic diagram of a client and a server.

FIG. 1 shows one example of a schematic diagram of a client 10 in communication with a server 12 over a communication network 14. A user 16 of the client device 10 sends a request 18 to the server 12 for the purpose of downloading a package of code 20, the request 18 specifying the package of code to be downloaded. Platform as a service, known as PaaS, builds upon the concept of software as a service, known as SaaS, in which applications are hosted by a vendor or service provider at the server 12 and made available to customers over the network 14, which can be the Internet. Requests 18 are made to the server 12 over the network 14 and the server 12 responds by transmitting the code 20 to the client 10.

The downloaded package of code 20 could be an Application Programming Interface (API) or Software Development Kit (SDK), for example. As part of API management within the server 12, the ability to download an SDK based upon an API can be provided. In this case, an SDK is a container of program code in source form, pre-compiled binary form, or both. This source code can either be static or dynamically generated, as part of the request and download process. The requesting user 16 can use the downloaded SDK to interact with an API hosted on the server 12. An example of an API is one built around a database table. Such an API has four general operations: selecting rows, inserting rows, updating rows, and deleting rows. A Java developer can generate a Java SDK and use the Java SDK in their Java applications in order to interact with the database table.

The provider of the API/SDK may wish to restrict the operations available from the SDK based on the user of that SDK. They may want to remove certain methods from static code, or omit certain methods in dynamically generated code, based on the rights of the user. For example, a standard user may only have read-only access, and should only have access to select rows from the database table. An advanced user might have more access, such as the ability to insert and update rows in the database table. This access rights mechanism can be implemented by making the user of the SDK pass some form of authentication tokens into the SDK, such as a username, password, or secret key. This access rights mechanism can be replaced or augmented by removing methods from the code 20 downloaded by the user 16, making it impossible for the user 16 to call them.

The provider of the API/SDK, through the server 12, may also wish to restrict access to the SDK being downloaded, based on the client machine 10 on which it is running. For example, it is possible to restrict access to an API by only allowing SDKs running on certain IP addresses to communicate with the server of that API. It may be desirable by the provider of API/SDK to embed the IP (Internet Protocol) address of the requesting system into the code downloaded by the user. The package of code 20 that is downloaded by the user 16 can then contain functionality that ensures that the code 20 can only be executed on the device 10 identified by the embedded IP address.

For SDKs provided in native languages such as C++, or Objective-C, it is more convenient if the user 16 is provided with pre-compiled binaries, as opposed to source code, that they do not need to compile themselves. In this case, the user 16 requesting the SDK would have to select the operating system and architecture for their particular system. Additionally, it is more convenient if the code 20 is provided in a package format suitable for the operating system of the requesting user 16, this is usually, e.g., ZIP on Windows and TAR on Linux.

The server 12 can identify the operating system and architecture of the requesting system 10 from the received request 18, in order to select a suitable pre-compilation and packaging method. Finally, when the user 16 comes to integrating the SDK into their own applications code base, they may alter the SDK to fit in with pre-existing code standards, or want comments or documentation that is customized to them. For example, developers on Linux will generally want LF line endings, while developers on Windows will want CRLF line endings. Developers may also want comments in the source code describing how to use the SDK made available in their native language. The server 12 can identify the operating system and other information about the user 16 directly from the received request (such as their native language) in order to format the code 20 on their behalf.

The server 12 can infer/extract information about the requesting client 10 and/or user 16 from the received request 18, and customize the provided code 20 to better fit that client 10 or user 16 during the download process. This information could be, but is not limited to, the rights of the requesting user 16, and which operations in the SDK they have access to invoke, the native language of the requesting user 16, the location and IP address of the requesting client 10 and/or the operating system and architecture of the requesting client 10.

When a user 16 requests the download of the package of code 20 (which is either pre-existing or will be dynamically generated), the server 12 inspects the request 18 in relation to the client 10 and/or the user 16 to infer and/or extract information such as the operating system being used, any access rights, a user ID if the request 18 originated within an environment secured by some form of authentication mechanism, and any other requesting client information that might be available. This information is then used to alter the code 20 to be specific to the requesting client 10 and/or user 16. The altered code 20 can then be downloaded by the requesting user 16.

This process is useful for a number of reasons. For example, code can be omitted if the requesting client 10 or user 16 does not have permission to use that code. Authorization information (either for the requesting client 10 or user 16) can be embedded into the code package 20 so that the user 16 of the code 20 does not have to supply it. Additionally, the code 20 can be altered so that the code 20 is restricted to run only under the requesting user 16, or on the requesting system 10. The code 20 can be formatted based on the user's platform configuration, such as the specific operating system and architecture, for example in relation to line endings in the source code. The language of the requesting user 16 can be identified, and the code 20 augmented with documentation written in that language. Source code can be pre-compiled into a binary form suitable to run on the requesting system 10.

In one embodiment, the server 12 works by inspecting header information provided as part of the request 18 to download the package of code 20, which identifies attributes of the particular requesting client 10 and/or user 16. When a request 18 is made to a HTTP (Hypertext Transfer Protocol) server 12 to download a package of code 20 using a web browser, or other HTTP client, a lot of information is passed from the client system 10 to the server system 12 in the request 18. At the network level, the server system 12 can extract the IP address of the originating client system 10 from the request 18. This IP address can then be embedded into the code 20 that is then downloaded by the user 16.

Figure 2:
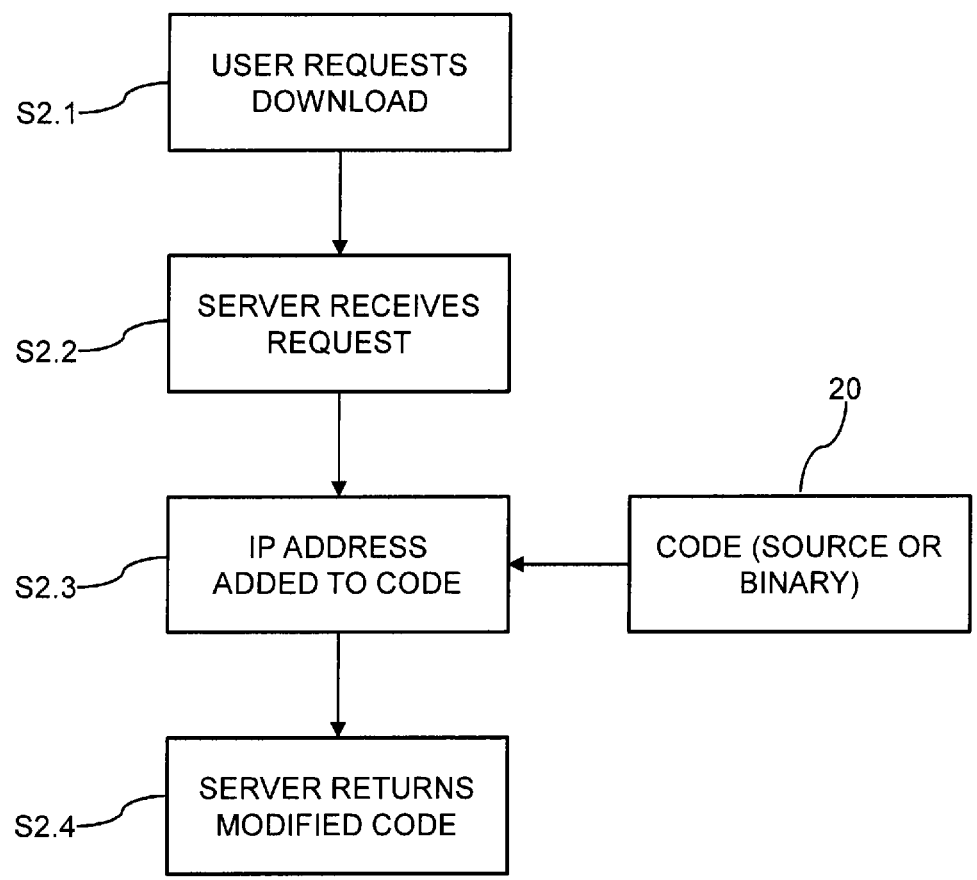
FIG. 2 is one example of a flowchart of a download process.

One example of this process is illustrated in FIG. 2, where in step S2.1, the user 16 requests the download of the code 20 using an HTTP client being run on the client device 10.

At step S2.2, the HTTP server 12 receives the request 18 for the download of the code 20 from the client 10. The code 20 is accessed by the server 12 in source or binary format, and at step S2.3, the IP address of the HTTP client is added to the code 20 by the server 12. If the code 20 is source code, then it is a straightforward task to add the IP address into the source code, as a plain text comment, for example. If the code 20 is binary code, then the addition of the IP address will be more complex and the exact process used will depend on the nature of the programming language of the code 20. For example, if the language is JAVA, then there are known techniques and tools for amending the binary code, such as the Byte Code Engineering Library (BCEL) or the ObjectWeb ASM library. At step S2.4, the HTTP server 12 returns the modified code 20, including the IP address, in response to the HTTP client.

Figure 3:
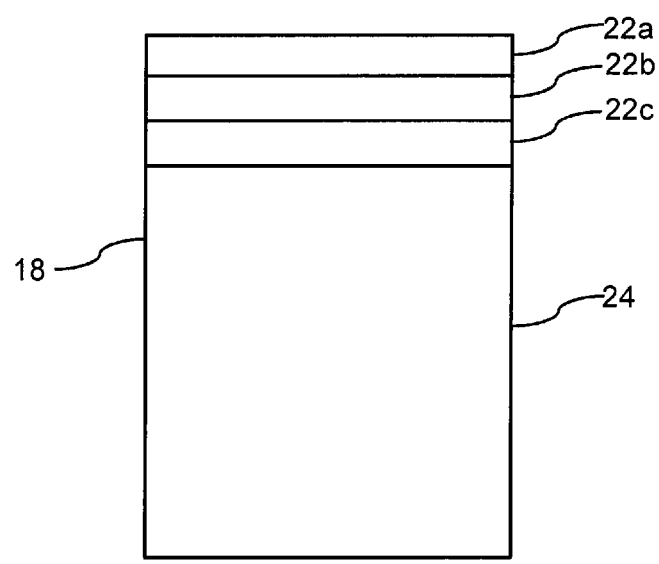
FIG. 3 is one example of a schematic diagram of an HTTP request.

In a client server communication that uses HTTP, information will be passed in HTTP headers from the HTTP client 10 to the HTTP server 12. An example of a relevant HTTP header is the User-Agent header. FIG. 3 illustrates schematically one example of the request 18, with a plurality of headers 22 (e.g., 22a, 22b, 22c) shown as present within the request 18. The request 18 also includes a body 24, which will include the nature of the download request being made by the client device 10. In an Internet based system, communications will be made using the HTTP protocol and the server 12 acquires information relating to the client 10 and/or the user 16 from the HTTP request 18 that has been sent by the client device 10 to the server 12.

A User-Agent header 22a identifies the type of HTTP client 10 that is making the request 18 to the server 12. An example of a User-Agent header 22a is the string "User-Agent: Mozilla/5.0 (X11; Linux x86_64; rv:12.0) Gecko/20100101 Firefox/21.0". From parsing the contents of this User-Agent header 22a the server 12 can identify the operating system (which is Linux) and the architecture (which is x86_64) of the requesting client device 10. This information can be used by the server 12 in its modification of the code package 20 prior to returning that code package to the client device 10. The modification occurs by replacing existing or effecting generated code according to a predefined schedule of amendments appropriate for the detected operating system and/or hardware being used. For example, the server 12 may therefore identify suitable line endings, pre-compilation and packaging methods for the code 20 that is then downloaded by the user 16. This is achieved using built in knowledge that maps the platform to the line endings and other features required for the specific platform. The predefined schedule of amendments appropriate for the specific platform defines the necessary changes to be made in this regard.

In one embodiment, the server 12 receives a request from the client 10 for the download of the package of code 20 in the form of an HTTP request 18 at the server 12 and the server 12 acquires information relating to the client 10 and/or the user 16 of the client 10 by extracting information from a header 22 of the HTTP request 18, using a simple parsing of the header to determine the necessary information. This provides a method of tailoring the code package 20 to the actual client device 10 and user 16, without the user having to make any specific requests or choices concerning the code package 20 and without additional communications having to pass between the client 10 and server 12. The user 16, using a web browser for example, on their client device 10 is able to select the code package 20 at the server 12 and the server 12 will modify the code package 20 prior to transmitting the code package 20 to the client 10.

Another header that is used in HTTP requests is the Accept-Language header, an example of which would be "Accept-Language: de-de", which means a German located in Germany. The Accept-Language header identifies the native language of the user 16 of the HTTP client 10 making the request 18. Another example of an Accept-Language header is the string "Accept-Language: zh-CN". From this Accept-Language header, the server 12 can identify, using a lookup table from the relevant code to a language, that the user 16 speaks Simplified Chinese. This language information can be used to insert Chinese comments or other documentation into the code 20 that is then downloaded by the user 16. Comments within the code (not the code logic) can be replaced with the local language, regardless of whether the code 20 is source code or binary. The server 12 identifies a language associated with the user 16 of the client 10 and the server modifies the package of code 20 according to the acquired information by inserting code comments for the identified language into the package of code 20.

Figure 4:
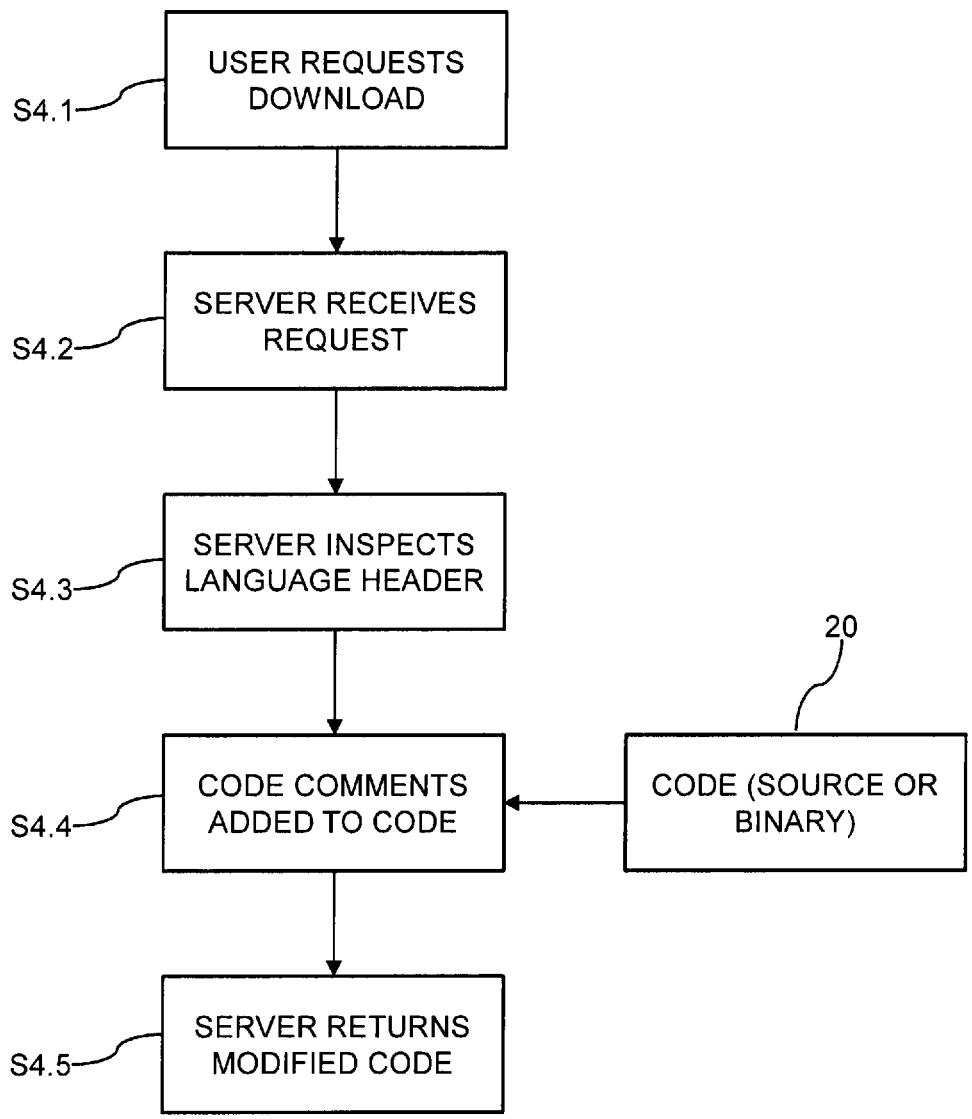
FIGS. 4 and 5 are examples of flowcharts of alternative download processes.

One embodiment of this process is illustrated in FIG. 4 where in step S4.1, the user 16 requests the download of the code 20 using an HTTP client being run on the client device 10. At step S4.2, the HTTP server 12 receives the request 18 for the download of the code 20 from the client 10. At step 4.3, the HTTP server 12 inspects the Accept-Language header provided by the HTTP client to determine the user's language. The code 20 is accessed by the server 12 in source or binary format, and at step S4.4, the code comments explaining how to use the code in the user's language are added to the code 20. At step S4.5, the HTTP server 12 returns the modified code 20 including the code comments in response to the HTTP client.

Figure 5:
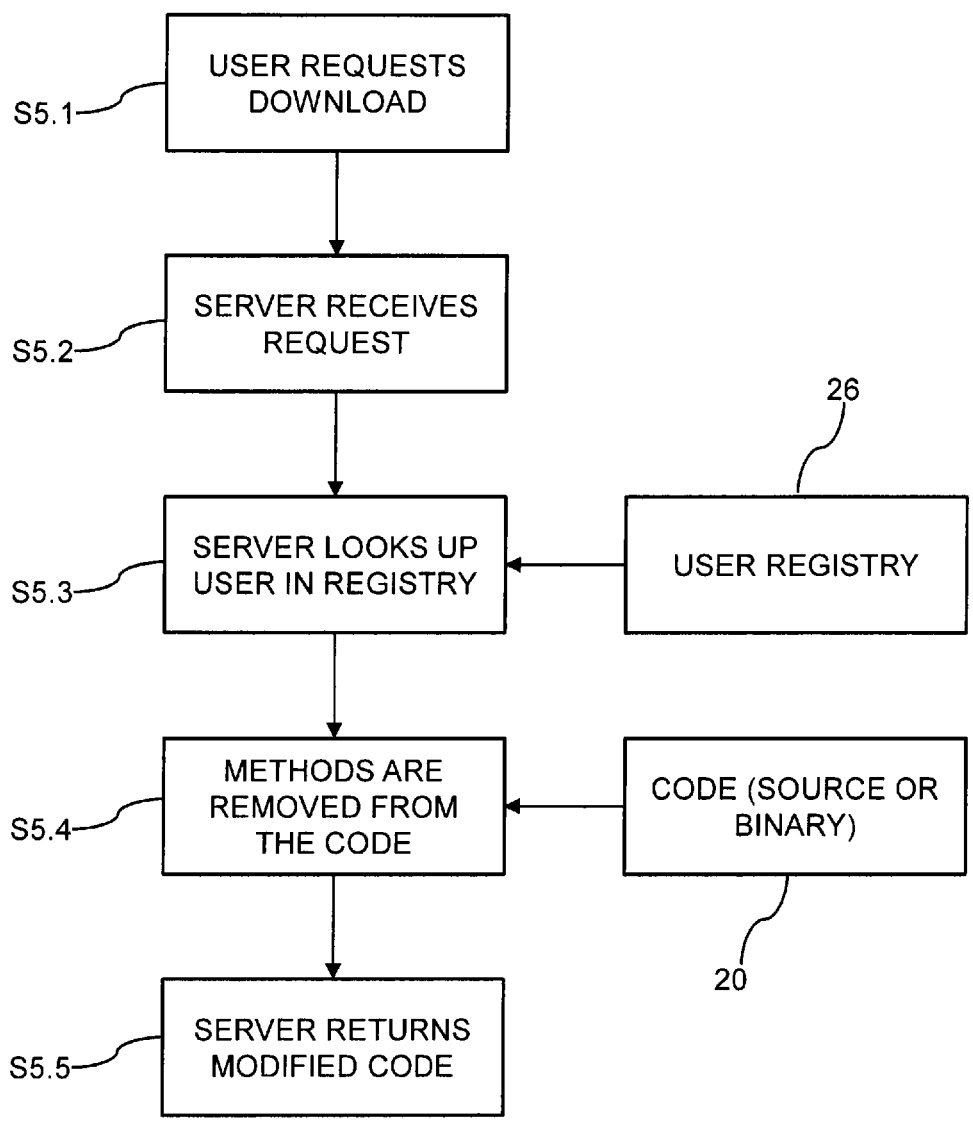

For HTTP servers that are secured with some form of authentication mechanism, such as HTTP basic authentication, SSL client certificates or single sign on etc., the server 12 can also identify information about the user 16 from a user registry 26, as shown in FIG. 5. This information may contain information such as the account type of the user 16 (whether it is free or paid), and the roles of the user 16 (such as basic user, power user or administrator). This information can be used to control which methods are omitted from the code 20 that is then downloaded by the user 16. The server 12 acquires information relating to the user 16 of the client 10 by identifying the user 16 of the client 12 in an entry in the user registry 26 and ascertains user access rights from the entry in the user registry 26. The server 12 modifies the package of code 20 according to the acquired information by removing one or more modules from the package of code 20 according to the ascertained user access rights. The level of access is known as it is set in relation to the user's identity and the modules have a known "access level". Those modules that the user does not have access to can be determined and these modules can be removed or hidden by the server 12. External API methods can be removed if they are not referenced by other internal methods and the original developer of the code package 20 can ensure that the access controlled methods can be removed if required. An alternative option would be to inline the "private" methods such that they cannot be called externally, but still used internally.

One example of this process is illustrated in FIG. 5 where in step S5.1, the user 16 requests the download of the code 20 using an HTTP client being run on the client device 10. At step S5.2, the HTTP server 12 receives the request 18 for the download of the code 20 from the client 10. At step 5.3, the HTTP server 12 looks up the user's role from the user registry 26. The registry 26 can be queried using the Lightweight Direct Access Protocol (LDAP), for example.

The server 12 therefore being able to communicate with the registry 26 and extract the required information. The code 20 is accessed by the server 12 in source or binary format, and at step S5.4, methods are removed from the code 20 depending on the user's role, as discussed above. At step S5.5, the HTTP server 12 returns the modified code 20 without methods the user's role does not permit in response to the HTTP client.

Figure 6:
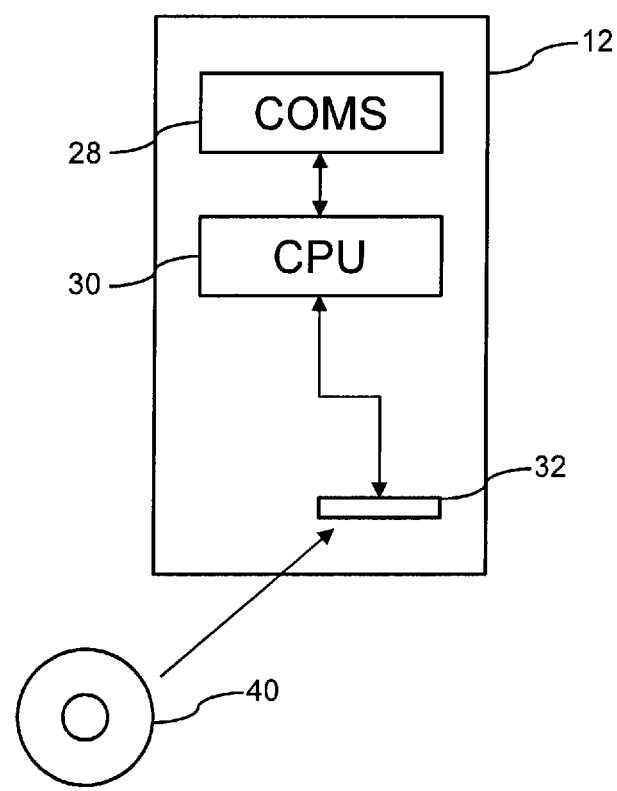
FIG. 6 is one example of a schematic diagram of the server.

FIG. 6 shows more detail of one example of the server system 12, which comprises a network interface 28 that receives the request 18 for download of the package of code 20 from the client 10, the request 18 specifying the package of code to be downloaded, and transmits the modified package of code 20 to the client 12; and a processor 30 which is connected to the network interface 28 and acquires information from the received request relating to the client 10 and/or the user 16 of the client 10 and modifies the package of code 20 according to the acquired information. The network interface 28 could be connected to a wide area network, such as the Internet, and communications are received by and transmitted from the server 12 using the HTTP protocol. The server 12 also includes a CD-ROM drive 32 connected to the processor 30. The server 12 also includes numerous other components, but these are omitted for clarity purposes.

Also shown in the Figure is a computer program product 40 for controlling the server 12, the computer program product 40 comprising a computer readable storage medium (a CD-ROM) having program instructions embodied therewith, the program instructions executable by the processor 30 to cause the processor 30 to perform one or more actions in response to the receipt of the HTTP request 18. The CD-ROM 40 can be inserted into the CD-ROM drive 32, in order for the processor 30 of the server 12 to access the computer program product.

As described herein, according to one aspect of the present invention, there is provided a computer implemented method comprising receiving at a server a request from a client for download of a package of code, the request specifying the package of code to be downloaded, acquiring information from the received request relating to the client and/or a user of the client, modifying the package of code according to the acquired information, and transmitting the modified package of code to the client.

According to another aspect of the present invention, there is provided a system comprising a network interface arranged to receive a request for download of a package of code from a client, the request specifying the package of code to be downloaded, and to transmit a modified package of code to the client, and a processor connected to the network interface and arranged to acquire information from the received request relating to the client and/or a user of the client and to modify the package of code according to the acquired information.

According to yet another aspect of the present invention, there is provided a computer program product for controlling a server, the computer program product comprising a computer readable storage medium having program instructions embodied therewith, the program instructions executable by a processor to cause the processor to receive a request from a client for download of a package of code, the request specifying the package of code to be downloaded, acquire information from the received request relating to the client and/or a user of the client, modify the package of code according to the acquired information, and transmit the modified package of code to the client.

Aspects of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
 receiving at a server a request from a client, for download of a package of code, the request specifying the package of code to be downloaded, wherein upon receipt of the package of code, the client can execute source code comprising the package of code locally;

acquiring information from the request received relating to a user of the client, wherein the information comprises a role of the user of the client, wherein the acquiring information relating to the user of the client comprises identifying the user of the client in an entry in a user registry and ascertaining user access rights from the entry in the user registry to determine the role of the user of the client;

automatically modifying the package of code according to the acquired information to provide a modified package of code specific to the user of the client, wherein functionality of the modified package of code, when executed on the client, is based on the role of the user of the client, wherein the automatically modifying the package of code according to the acquired information to produce the modified package of code comprises automatically removing one or more methods from the package of code, wherein each method of the one or more methods comprises source code, and wherein the one or more methods comprise a known access level, and wherein the automatically removing the one or more methods from the package of code is based on the role of the user of the client not permitting use of methods of the known access level of the one or more methods;

compiling, at the server, the modified package of code; and transmitting the modified package of code to the client, wherein the client can immediately execute source code comprising the modified package of code locally.

2. The computer-implemented method according to claim 1, wherein the receiving at the server the request from the client for download of the package of code comprises receiving a Hypertext Transfer Protocol (HTTP) request at the server, and wherein the identifying the user of the client in an entry in the user registry further comprises extracting information from a header of the HTTP request to identify the user of the client.

3. The computer-implemented method according to claim 1, wherein the acquiring information relating to the user of the client comprises identifying an Internet Protocol (IP) address of the client, and wherein the modifying the package of code according to the acquired information to produce the modified package of code comprises inserting the IP address into the package of code.

4. The computer-implemented method according to claim 1, wherein the acquiring information relating to the user of the client comprises identifying a language associated with the user of the client, and wherein the modifying the package of code according to the acquired information to produce the modified package of code comprises inserting code comments for the identified language into the package of code.

5. A system comprising:
a network interface to receive a request from a client for download of a package of code; and
a processor connected to the network interface, wherein the system is configured to perform a method, the method comprising:
receiving at a server a request from a client, for download of a package of code, the request specifying the package of code to be downloaded, wherein upon receipt of the package of code, the client can execute source code comprising the package of code locally;
acquiring information from the request received relating to a user of the client, wherein the information comprises a role of the user of the client, wherein the acquiring information relating to the user of the client comprises identifying the user of the client in an entry in a user registry and ascertaining user access rights from the entry in the user registry to determine the role of the user of the client;
automatically modifying the package of code according to the acquired information to provide a modified package of code specific to the user of the client, wherein functionality of the modified package of code, when executed on the client, is based on the role of the user of the client, wherein the automatically modifying the package of code according to the acquired information to produce the modified package of code comprises automatically removing one or more methods from the package of code, wherein each method of the one or more methods comprises source code, and wherein the one or more methods comprise a known access level, and wherein the automatically removing the one or more methods from the package of code is based on the role of the user of the client not permitting use of methods of the known access level of the one or more methods;
compiling, at the server, the modified package of code; and
transmitting the modified package of code to the client, wherein the client can immediately execute source code comprising the modified package of code locally.

6. The system according to claim 5, wherein the receiving the request from the client for download of the package of code comprises receiving a Hypertext Transfer Protocol (HTTP) request, and wherein the identifying the user of the client in an entry in the user registry further comprises extracting information from a header of the HTTP request to identify the user of the client.

7. The system according to claim 5, wherein the acquiring information relating to the user of the client comprises identifying an Internet Protocol (IP) address of the client, and wherein the modifying the package of code according to the acquired information to produce the modified package of code comprises inserting the IP address into the package of code.

8. The system according to claim 5, wherein the acquiring information relating to the user of the client comprises identifying a language associated with the user of the client, and wherein the modifying the package of code according to the acquired information to produce the modified package of code comprises inserting code comments for the identified language into the package of code.

9. A computer program product comprising:
a computer readable storage medium readable by a processing circuit and storing instructions for execution by the processing circuit for performing a method comprising:
receiving at a server a request from a client, for download of a package of code, the request specifying the package of code to be downloaded, wherein upon receipt of the package of code, the client can execute source code comprising the package of code locally;
acquiring information from the request received relating to a user of the client, wherein the information comprises a role of the user of the client, wherein the acquiring information relating to the user of the client comprises identifying the user of the client in an entry in a user registry and ascertaining user access rights from the entry in the user registry to determine the role of the user of the client;
automatically modifying the package of code according to the acquired information to provide a modified package of code specific to the user of the client, wherein functionality of the modified package of code, when executed on the client, is based on the role of the user of the client, wherein the automatically modifying the package of code according to the acquired information to produce the modified package of code comprises automatically removing one or more methods from the package of code, wherein each method of the one or more methods comprises source code, and wherein the one or more methods comprise a known access level, and wherein the automatically removing the one or more methods from the package of code is based on the role of the user of the client not permitting use of methods of the known access level of the one or more methods;

compiling, at the server, the modified package of code; and transmitting the modified package of code to the client, wherein the client can immediately execute source code comprising the modified package of code locally.

10. The computer program product according to claim 9, wherein the receiving at the server the request from the client for download of the package of code comprises receiving a Hypertext Transfer Protocol (HTTP) request at the server, and wherein the identifying the user of the client in an entry in the user registry further comprises extracting information from a header of the HTTP request to identify the user of the client.

11. The computer program product according to claim 9, wherein the acquiring information relating to the user of the client comprises identifying an Internet Protocol (IP) address of the client, and wherein the modifying the package of code according to the acquired information to produce the modified package of code comprises inserting the IP address into the package of code.

12. The computer program product according to claim 9, wherein the acquiring information relating to the user of the client comprises identifying a language associated with the user of the client, and wherein the modifying the package of code according to the acquired information to produce the modified package of code comprises inserting code comments for the identified language into the package of code.

* * * * *